United States Patent [19]

Wada

[11] Patent Number: 4,827,402
[45] Date of Patent: May 2, 1989

[54] BRANCH ADVANCED CONTROL APPARATUS FOR ADVANCED CONTROL OF A BRANCH INSTRUCTION IN A DATA PROCESSING SYSTEM

[75] Inventor: Kenichi Wada, Sagamihara, Japan

[73] Assignee: Hitachi, Ltd., Tokyo, Japan

[21] Appl. No.: 854,511

[22] Filed: Apr. 22, 1986

[30] Foreign Application Priority Data

Apr. 22, 1985 [JP] Japan ................................. 60-84397

[51] Int. Cl.⁴ ....................... G06F 09/38; G06F 09/30
[52] U.S. Cl. ................................. 364/200; 364/255.1; 364/261.7
[58] Field of Search ... 364/200 MS File, 900 MS File

[56] References Cited

U.S. PATENT DOCUMENTS

| | | | |
|---|---|---|---|
| 4,310,880 | 1/1982 | Gehman | 364/200 |
| 4,430,706 | 2/1984 | Sand | 364/200 |
| 4,435,756 | 3/1984 | Potash | 364/200 |
| 4,443,848 | 4/1984 | Gehman | 364/200 |
| 4,471,433 | 9/1984 | Matsumoto et al. | 364/200 |

*Primary Examiner*—Eddie P. Chan
*Attorney, Agent, or Firm*—Antonelli, Terry & Wands

[57] ABSTRACT

In the pipeline data processing system, a branch instruction is preliminarily detected from a string of instructions to be executed before execution thereof and the branch address is calculated. When the branch address is thereafter changed due to a change in the content of the register used to calculate the branch address, the calculated branch address is invalidated and a new branch address is calculated and the branch is executed. The change of the branch address is checked and performed on a basis of the comparison between the fields used for address calculation and the field of the address into which the data is to be written.

7 Claims, 4 Drawing Sheets

FIG. 3A
PRIOR ART

INSTRUCTION 0 — D A L E P
INSTRUCTION 1 — D A L E P
INSTRUCTION 2 — D A L E P
BRANCH INSTRUCTION 3 — D A L E P
INSTRUCTION 4 — D A
INSTRUCTION 5 — D
TARGET INSTRUCTION — D A L E P

FIG. 3B

INSTRUCTION 0 — D A L E P
PRE-EXECUTION BRANCH INSTRUCTION — DP AP LP
INSTRUCTION 1 — D A L E P
INSTRUCTION 2 — D A L E P
BRANCH INSTRUCTION 3 — D A L E P
TARGET INSRUCTION — D A L E P

FIG. 3C

INSTRUCTION 0 — D A L E P
PRE-EXECUTION BRANCH INSTRUCTION — DP AP LP
INSTRUCTION 1 — D A L E P
INSTRUCTION 2 — D A L E P
BRANCH INSTRUCTION 3 — D A L E P
TARGET INSTRUCTION — D A

BRANCH ADVANCED CONTROL APPARATUS FOR ADVANCED CONTROL OF A BRANCH INSTRUCTION IN A DATA PROCESSING SYSTEM

BACKGROUND OF THE INVENTION

1. Field of the Invention

The present invention relates to an advanced control in a data processing system and, more particularly, to an advanced control for a branch instruction in a data processing system of the type which executes a series of instructions in a pipelined system.

2. Description of the prior art

One of the problems regarding the handling of the branch instruction in an advanced control apparatus, particularly, the advanced control for the branch instruction in the data processing system of a pipeline system relates to how to specify the address of the target instruction (i.e. the branch address). To preliminarily fetch the target instruction in the advanced control, the branch address is calculated earlier using the contents of several registers which are designated by the branch instruction and the instruction fetching operation from this address is started. However, there can occur the case where the instruction preceding the branch the branch instruction in the instruction string is executed after completion of the calculation of the branch address, so that the content of the register used for the precedent address calculation is changed. In such a case, the instruction fetching from the address previously calculated becomes meaningless; thus, the address calculation and instruction fetch must be again executed.

In the control apparatus disclosed in Japanese Patent Unexamined Publication No. 39437/75 which is owned by the present assignee, there are provided, for each general purpose register, a register (GPR information register) for displaying the presence of the instruction which changes the content of that general purpose register and a circuit for resetting the above-mentioned display in response to the end of the execution of this instruction. The branch address is calculated only when the display regarding the register necessary for this calculation is reset. An amount of hardware of the register and the circuits relative to this register is considerably large. This apparatus also requires an arithmetic operating unit only for calculating the branch address. The amount of hardware increases also from this proposed solution.

Although various other kinds of apparatuses for handling the branch instruction in the advanced control apparatus have also been proposed, it is difficult to realize most of these apparatuses because of an excessive amount of necessary hardware.

SUMMARY OF THE INVENTION

It is an object of the invention to provide an advanced control apparatus which can efficiently execute the advanced control process of a branch instruction by a small amount of hardware.

The use of the information register for monitoring the possibility of the change in the content of the general purpose register (GPR) causes an amount of hardware to be increased. Although the address of the write data (i.e. data to be written) indicates nothing about the content of the data, it means that the data of that address will be changed. Therefore, by monitoring the address of the write data, the occurrence of the change in the content of a particular register can be discriminated.

According to the invention, when a branch instruction is detected in an instruction buffer a portion of the branch instruction designating an address data source (index register, base register, etc.) is held in a register or the like. The instruction fetch is started using the address calculated on the basis of the held designating portion. Thereafter, the held address data source information is always compared with information designating the write address of the decoded instruction (e.g. the register for storing the result of the arithmetic operation). If they coincide, this means that the address previously calculated is incorrect and the address calculation and the instruction fetch subsequent thereto should be newly performed. Meanwhile one of a plurality of address calculating apparatuses provided for the instruction which needs a plurality of operand addresses can be used to calculate the branch address.

The GPR information register in the apparatus disclosed in the above-mentioned Japanese Patent Unexamined Publication is useful to prevent the vain (incorrect) address calculation and the instruction fetching operation due to this calculation. However, when the content of the address data source of the branch instruction is changed by the preceding instruction, there hardly occurs a situation that the time for obtaining the correct target instruction is increased by such a system. According to the invention, as compared with the apparatus of Japanese Patent Unexamined Publication mentioned above, the advanced control effect regarding the branch instruction of almost the same degree can be obtained by a fairly smaller amount of hardware.

BRIEF DESCRIPTION OF THE DRAWINGS

FIGS. 3A to 3C are time charts for execution in the pipeline system of the instruction string including a branch instruction;

DESCRIPTION OF THE PREFERRED EMBODIMENTS

Figure 1:
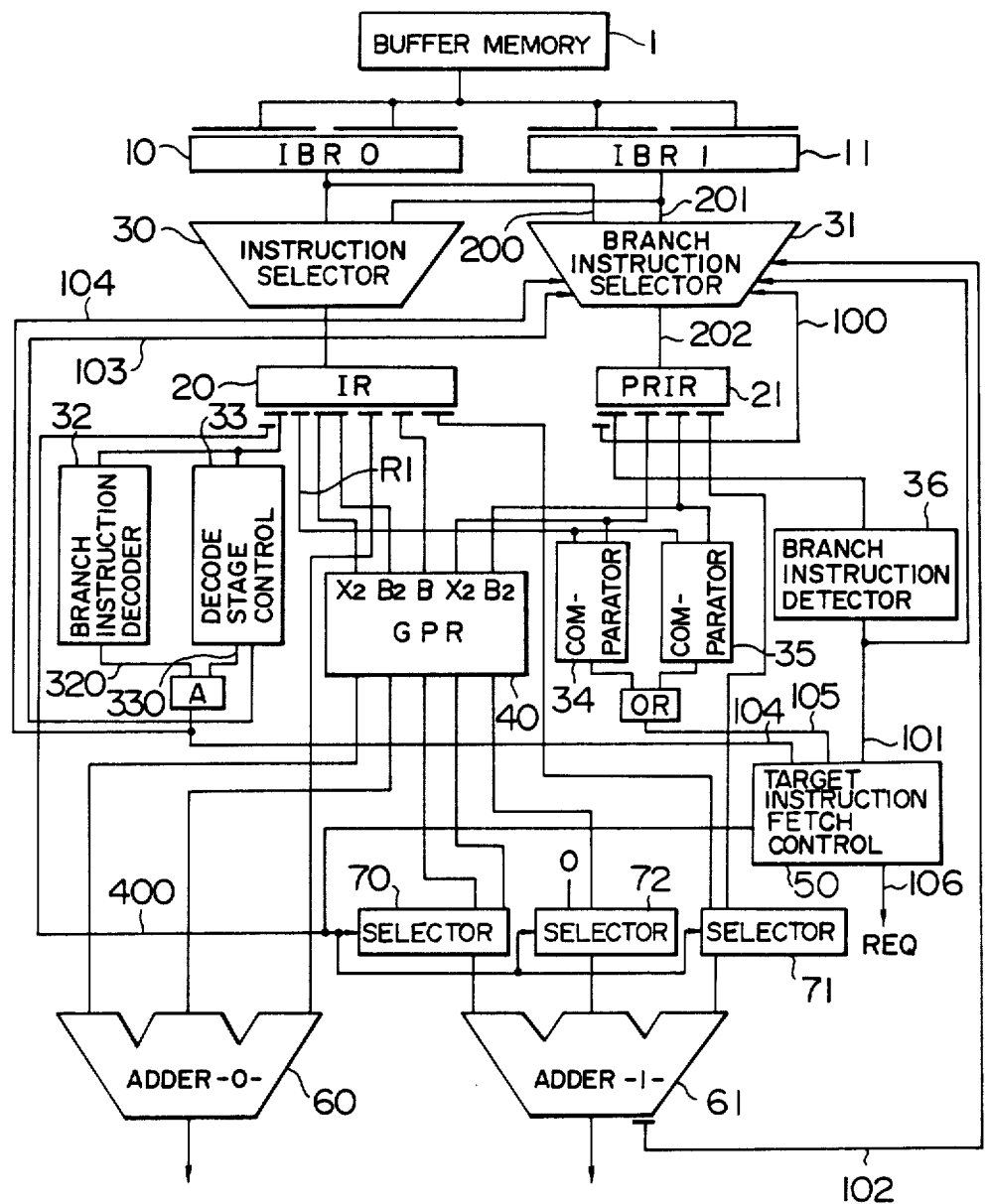
FIG. 1 is a block diagram of an embodiment of the present invention.

In the diagram FIGS. 1-5, reference numerals 10 and 11 denote instruction buffer registers; 20 is an instruction register; 21 a precedence instruction register to hold a branch instruction; 34 and 35 comparators for detecting the coincidence of the registers; 36 a branch instruction detector; 50 a target instruction fetch control circuit; and 61 an adder which is commonly used for calculations of the addresses of the target instruction and the second operand.

Figure 2:
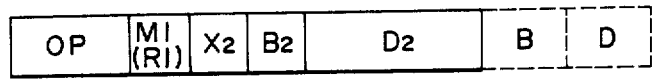
FIG. 2 is a format diagram of a branch instruction.

In FIG. 2 showing a format of a typical branch instruction, an OP field instructs an operation; an M1 field indicates a branch condition; X2 and B2 fields designate one of general purpose registers, respectively; and a D2 field gives a displacement value in an memory address. An effective address of a target instruction is obtained by calculating the following expression;

$$(X2)+(B2)+D2$$

where parentheses denote the content of the register.

The instruction of the type which designates the operation between an operand in the register and an operand in a memory device has an R1 field for designating a register which holds the first operand and also is adapted to receive the result of the arithmetic operation, in place of the M1 field in the above format. For the instruction o the type which designates the operation between operands in the memory device (hereinafter, this instruction is referred to as an SS type instruction), a base register field B and a displacement field D are added to the format of FIG. 2. On the other hand, the instruction which designates the operation between operands in the register has the length of half of the instruction of FIG. 2 and has R1 and R2 fields for the first and second operands.

In this embodiment, there are three kinds of lengths of instructions and the length of each instruction is indicated by the value of higher two digits of the OP field. Particularly, this value is "11" in the case of the SS type instruction.

The pipeline control system has conventionally been known as the system for processing an instruction word at a high speed. According to this method, the respective stages of executing an instruction are alloted to separate logic apparatuses, thereby performing a kind of assembly-line operation. For example, stage D for decoding the instruction and calculating the address of the operand, stage A for accessing the memory device using the address obtained, stage L for transferring the operand read out, stage E for performing the operation using the operand, and stage P for writing the result of the operation into various kinds of registers which are simultaneously executed in parallel. In the case of the SS type instruction having two memory operands, two operand addresses are calculated in parallel using two adders in the stage D. In the stage A, the memory device is accessed in parallel using the two addresses obtained.

FIG. 3A shows timings when the instruction string including a branch instruction is executed in the ordinary (namely, the branch instruction is not preexecuted) pipeline system. Each instruction is executed separately in the stages D, A, L, E, and P. The successive instructions can be ordinarily inputted to the pipeline with the delay times for every stage, so that a plurality of instructions are executed in parallel in different stages. In general, a target instruction is fetched through the stages D, A, and L of the branch instruction. The stage for fetching a target instruction into a instruction buffer register is E. Therefore, as shown in the diagram, when a branch instruction is executed, the delay time of three stages is caused.

FIG. 3B shows timings for executing an instruction string including a branch instruction in accordance with the embodiment of the invention. The pre-executing process of a branch instruction 3 is performed in accordance with the sequence in parallel with the execution of the instruction 1. In the sequence of pre-executing a branch instruction, DP is the stage for decoding a branch instruction and calculating the address of a target instruction; AP is the stage for fetching a target instruction from a memory device; and LP is the stage for transferring the target instruction from the memory device into an instruction buffer register. So long as the content of the data source used in the address calculation performed during the pre-executing sequence is not changed by the instructions 1 and 2, the target instruction can be executed subsequent to the branch instruction 3 without any particular delay time. Thus, high processing speed can be accomplished as compared with the process in FIG. 3A. When the content of the data source was changed, the target instruction previously fetched is not used in order to prevent the occurrence of a malfunction.

FIG. 1 shows an embodiment of an instruction control system. The instruction selected from a buffer memory device 1 is processed by either one of two streams. If the stream number at this time is "0", the instruction is inputted to the instruction buffer register (IBR-0-) 10. If the stream number is "1", the instruction is inputted to the istruction buffer register (IBR-1-) 11. It is now assumed that the stream number is "0". The instruction in the instruction buffer register IBR-0- 10 is selected one by one by an instruction selector circuit 30 and set into the instruction register (IR) 20 and decoded. In the stage D for decoding the instruction and calculating the address of an operand, the content of a general purpose register GPR 40 is read out using the X2 and B2 fields of the instruction. The operand address is calculated using an adder-0- 60. The calculated address is sent to a buffer memory device-0-. If the instruction set to the IR 20 is the SS type instruction, the address calculation of the first operand using the adder-0- 60 and the address calculation of the second operand using the adder-1- 61 are simultaneously performed. The respective addresses obtained are sent to the buffer memory device-0- and buffer memory device-1-. The buffer memory device-0- stores only the address of the operand. The buffer memory device-1- stores both of the addresses of the operand and the instruction. After completion of the decoding of the instruction and the address calculation, a decode stage control circuit 33 sends a decode success signal 330. The decode stage control circuit 33 also controls or manages a stream number 103. When a branch is successful, the control circuit 33 switches the stream number 103 to "1".

A branch instruction selector circuit 31 selects one instruction from the instruction buffer register IBR-0- 10 and sets it into the preselect instruction register (PRIR) 21. This selecting operation is performed independently of and in parallel with the instruction selector circuit 30 for the instruction register 20. A branch instruction detector 36 discriminates whether the instruction set in the PRIR 21 is a branch instruction or not. The result of the discrimination is sent to an output line 101.

If the instruction set in the PRIR 21 is not a branch instruction, the signal level of the output line 101 is "0". In response to this "0" signal, the branch instruction selector circuit 31 finds out the length of instruction from higher two bits 100 of the instruction code in the PRIR 21 and renews the instruction buffer pointer for indicating a location where the next instruction is to be selected. The selector circuit 31 selects the next one instruction on the basis of the value of the instruction buffer pointer and sets it into the PRIR 21. In this manner, the next instruction is preselected.

If the instruction set in the PRIR 21 is a branch instruction, the signal level of the output line 101 of the branch instruction detector 36 becomes "1". In response to this "1" signal, the instruction buffer pointer in the branch instruction selector circuit 31 is held to the same state and the next instruction is not selected. Thus, this branch instruction is held in the PRIR 21. This holding continues until this branch instruction is sent to the IR 20 and the stage D is completed.

When a branch instruction is held in the PRIR 21, the calculation of the target address by the adder-1-61 is tried using the X2 and B2 fields. At this time, if the instruction stored in the IR 20 is the SS type instruction, the calculation of the branch address should wait. Namely, the adder-1- 61 calculates the second operand address. In the case of the SS type instruction, upper two bits of the IR 20 are "11" and this signal 400 serves to control input selectors 70, 71, and 72 of the adder-1-61, thereby allowing the second operand address data source of the IR 20 to be selected. However, since one register is used for the address calculation of the second operand of the SS type instruction, the selector 72 selects "0".

Unless the instruction set in the IR 20 is the SS type instruction, the selectors 70, 71, and 72 select the output of the PRIR 21, so that the address of a target instruction is calculated by the adder-1- 61. The address obtained is sent to the buffer memory device-1. The target instruction fetch control circuit 50 recognizes this address and sets the signal level of the fetch request (REQ) on line 106 to "1". Referring now to FIG. 3B, it will be understood that the stage D of the instruction 1 and the stage DP of fetching the target instruction proceed simultaneously.

As shown in FIG. 3B, the instruction 2 and subsequent instructions are not decoded yet at the time when the target address is calculated in the stage DP. Thus, it is unclear whether the contents of the registers X2, B2, and the like used in the address calculation in the stage DP are rewritten by the instruction 2 and subsequent instructions or not. If the contents of these registers are rewritten, the branch address calculated in the stage DP must be invalidated.

The system disclosed in Japanese Patent Unexamined Publication No. 39437/1975 includes general purpose registers (GPR), GPR information registers for displaying the existence of an instruction which may rewrite the contents of the GPR, and reset circuit for resetting the GPR information register when the monitored instruction has been executed. Calculation of the address of a target instruction is carried out after it is confirmed that the content of the related register will not be rewritten or that it has been rewritten. Therefore, a large amount of hardware is needed in the system. When the content of the register is rewritten in the system as described above, calculation of the correct branch address is allowed only after the completion of the execution of the stage P of the preceding instruction.

According to the embodiment of the present invention, if the branch instruction was found in the instruction buffer register, the branch address is immediately calculated as long as the adder is available. The target instruction fetch control circuit 50, however, checks to see if the content of the register used for the calculation of the branch address (i.e. address of the target instruction) has been changed or not after the fetch request signal REQ on the line 106 had been sent, as will be explained later. In the stage AP of the branch instruction prefetching sequence in FIG. 3B, the instruction 2 is in the stage D. At this time, the instruction 2 is stored in the IR 20 in FIG. 1 and the branch instruction 3 is held in the PRIR 21. The X2 and B2 fields in the PRIR 21 are compared with the R1 (register into which the result of the operation is written) field in the IR 20 by the comparators 34 and 35, respectively. Each of these comparators detects the coincidence between R1 and X2 (or B2) fields. If the signal level of an OR output line 105 representing the result of these comparisons is "0", there is no coincidence. Therefore, the X2 and B2 registers are not rewritten, so that the address calculated in the stage DP is effective. However, if the OR output 105 is "1", at least one of the registers will be rewritten, so that the address calculated in the stage DP is invalid and should be invalidated. This comparing operation is continued until the branch instruction 3 is set to the IR 20.

In the case of FIG. 3B, the signal level of the line 105 is "0" and the stages DP, DA, and DL of the branch instruction pre-executing sequence are effective. The stage D of the target instruction can be started immediately after the end of the stage D of the branch instruction 3, so that no delay time is caused.

FIG. 3C shows the case where the instruction 2 rewrites at least one of the registers which are indicated by the X2 or B2 field of the branch instruction 3. When the signal level of the line 105 is "1" in FIG. 1, the target instruction fetch control circuit 50 invalidates the address calculation in the stage DP. When the branch instruction 3 is set in the IR 20, the address of the target instruction is again calculated in the stage D and the control circuit 50 is triggered by an AND output 104 (i.e., by an branch decode success signal, branch DSQ), which is an AND of (1) output 320 of a branch instruction decoder 32 for discriminating a branch instruction and (2) decode success signal 330 of the decode stage control circuit 33. Thus, the control circuit 50 restarts the fetch of the target instruction. Since the instruction 2 is written into the register in the stage P, the signal level of the output line 104 becomes "1" in the next cycle of the stage P of the instruction 2. Since the target instruction is fetched through the stages D, A, and L of the branch instruction 3, the stage D of the target instruction is delayed similarly to the case of FIG. 3A. However, the operation in such a case is also substantially the same as that in the apparatus disclosed in Japanese Patent Unexamined Publication No. 39437/75.

Figure 4:
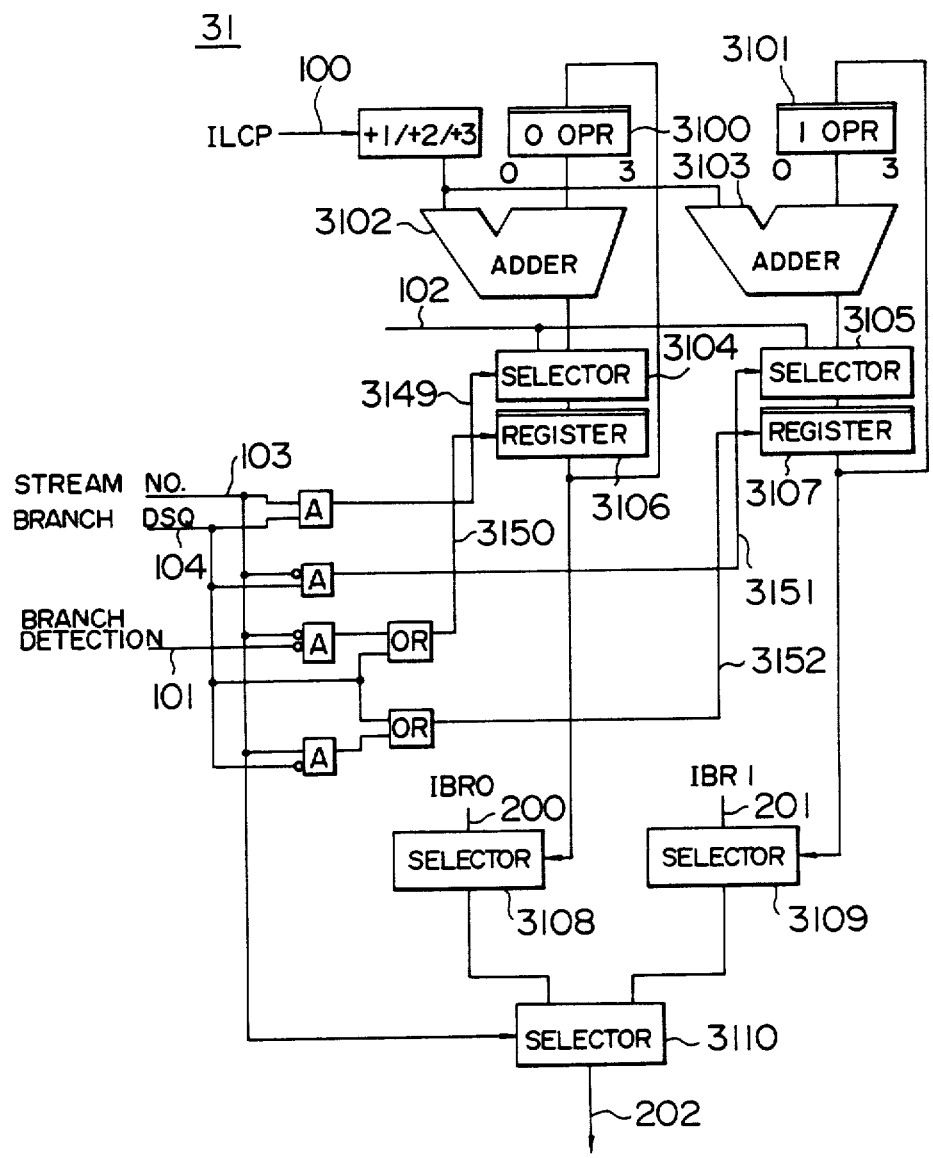
FIG. 4 is a block diagram of a branch instruction selection circuit in FIG. 1.

FIG. 4 shows the details of the branch instruction selector circuit 31 in FIG. 1. This circuit has two sets of similar element groups. Namely, one set includes a pointer 00PR 3100, an adder 3102, a selector 3104, a register 3106, and a selector 3108 for the instruction buffer register IBR-0-10. The other set includes a pointer 10PR 3101, an adder 3103, a selector 3105, a register 3107, and a selector 3109 for the instruction buffer register IBR-1-11.

It is now assumed that the instructions other than the branch instruction are stored in the IBR-0- 10 and the stream number is "0". The instruction length is selected by the pointer 3100 and upper two bits ILCP 100 of the PRIR 21. The value of the next pointer is calculated by the adder 3102. In this case, since the decode success signal (branch DSQ) 104 of the branch instruction is "0", the signal level of a line 3149 is "0" and the selector 3104 selects an output of the adder 3102. If the instruction set in the PRIR 21 is not the branch instruction, the signal level of the line 101 is "0" and the current stream number 103 is "0", so that the level of a set signal 3150 of the register 3106 becomes "1" and the value of the pointer of the next instruction is formed in the register 3106. By use of the content of the register 3106, the next instruction is selected by the selector 3108 from an output line 200 of the IBR-0- 10. Since the stream number 103 is "0", a selector 3110 selects an output of the selector 3108. If the instruction set in the PRIR 21 is a branch instruction, the level of the branch detection output 101 becomes "1", so that the set signal 3150 of the register 3106 is "0" and the register 3106 is not updated. Namely, the content of the register 3106 indicates the position for selecting the branch instruction. Therefore, the branch instruction is outputted from the IBR-0- to an output 202 through the selectors 3108 and 3110.

When the branch instruction is set in the IR 20 and the stage D of the branch instruction is completed, the branch DSQ 104 becomes "1". Since the stream number 103 is still "0", the signal level of a line 3151 is "1" and the selector 3105 for the IBR-1- 11 selects the output line 102 of the adder-1- by the "1" signal on the line 3151. In addition, since the level of a set signal 3152 of the register 3107 also becomes "1", lower three bits of an output 102 of the adder-1- 61 are set in the register 3107. If the branch was successful, the stream number 103 becomes "1" and the selector 3110 is switched and the instruction buffer which is used is changed to the IBR-1- 11. For preparation of this case, lower three bits 102 of the branched address (i.e., the initial value) are preliminarily set into the register 3107. Thereafter, similarly to the case of using the IBR-0 10, the adder 3103, selector 3105, register 3107, selector 3109, and selector 3110 operate. In this case, the different point is that the stream number 103 is "1".

If the branch is unsuccessful, the stream number 103 does not become "1". After completion of the stage D of the branch instruction, the branch DSQ 104 becomes "1" and the value of the pointer for the next instruction of the branch instruction is set in the register 3106 since the level of the set signal 3150 in the register 3106 becomes "1". In this case, the stream number 103 is held to "0", so that the selector 3110 selects the instruction from the IBR-0- 10 through the selector 3108. Thereafter, substantially the same operation as that mentioned above is continuously performed.

Figure 5:
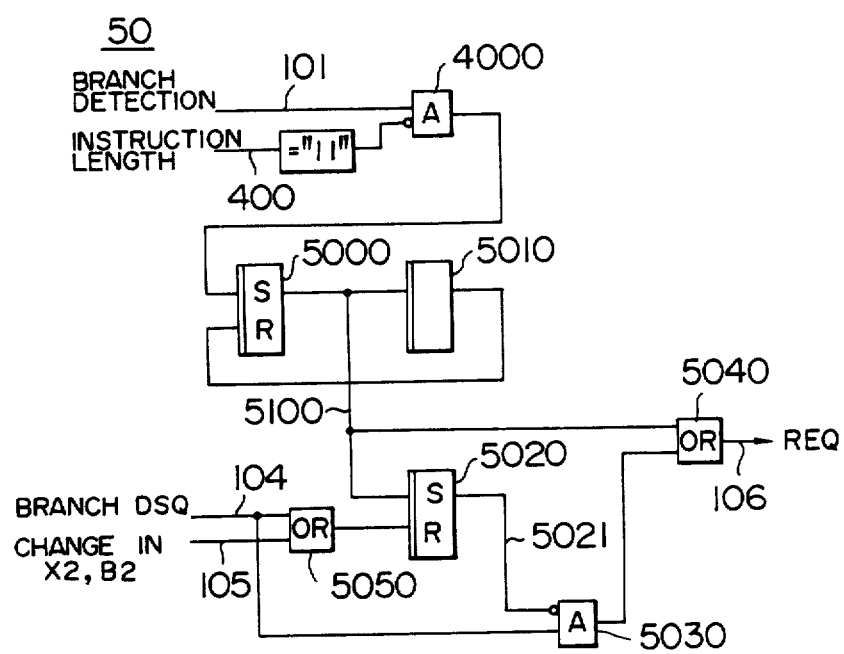
FIG. 5 is a block diagram of a target instruction fetch control circuit in FIG. 1.

FIG. 5 is a diagram showing the target instruction fetch control circuit 50 in FIG. 1, in further detail. If the instruction set in the PRIR 21 is the branch instruction, the level of the branch detection output 101 becomes "1". As mentioned previously, in the case where the signal 400 of upper two bits of the instruction set in the IR 20 at this time is not "11" (namely, not the SS type instruction), the address of the target instruction is calculated by the adder-1- 61 and the request REQ 106 can be outputted to the buffer memory device-1-. In FIG. 5, if the branch detection output 101 is "1" and the instruction length 400 is not "11", a flip-flop 5000 is set. The flip-flop 5000 is reset by a delayed flip-flop 5010 after an expiration of a predetermined period of time and outputs a one-cycle pulse of level "1" to a line 5100. The fetch request REQ 106 is formed by this "1" signal.

On the other hand, an output of the flip-flop 5000 sets a predecode effective flip-flop 5020. However, when the signal level of the OR gate signal line 105 of the outputs of the comparators 34 and 35 becomes "1", the flip-flop 5020 is reset. Namely, in the case where the subsequent instruction indicates rewriting of the registers which are designated by the X2 and B2 fields used for the address calculation in the stage DP, a flip-flop 5020 is reset. When the stage D is completed after the branch instruction had been set in the IR 20, the branch output DSQ 104 becomes "1". At this time, when the level of an output line 5021 of the flip-flop 5020 is "0", namely, when the address calculated in the stage DP is invalid, the request REQ 106 is again set to "1" by the branch DSQ 104. On the contrary, if the signal level of the line 5021 is "1", namely, when the address calculated in the stage DP is effective, the request REQ 106 is held to "0" and the re-fetching operation from the buffer memory device 1 is not performed. When the branch output DSQ 104 becomes "1", the flip-flop 5020 is reset and the apparatus is returned to the initial state and the operation of searching the next branch instruction is then executed.

As described above, according to the present invention, there is no need of providing the apparatus for recording and searching the schedule and completion of the changes of the contents of the registers. The validity of the address calculation for the precedent selection or fetching of a target instruction can be checked by a simple comparing circuit. Therefore, by merely adding a small amount of hardware, the process of the branch instruction can be remarkably improved.

I claim:

1. A data processing system comprising:
   means for fetching an instruction to be executed by said system
   means for temporarily holding an instruction before the fetch thereof by said instruction fetching means;
   means for detecting whether said instruction in said temporarily holding means is a branch instruction or not;
   at least one register for storing information to be used for determining a branch address of a target instruction, when said instruction is a branch instruction;
   means for calculating an address of a target instruction, when said instruction is a branch instruction, by using the content of said at least one register, before the execution of the detected branch instruction;
   means for sending a target instruction request signal requesting said instruction fetching means to fetch a target instruction
   means for monitoring the content of said at least one register to indicate whether an instruction preceding said branch instruction caused a change in the content of said at least one register invalidating said address of said target instruction calculated by said means for calculating;
   means for detecting whether an instruction in said temporarily holding means preceding a branch instruction is an instruction for causing a change in the content of said at least one register; and
   means for causing said sending means to send a target instruction request signal to said instruction fetching means after said address calculating means calculates an address of a target instruction based on the content of said at least one register after said change if said detecting means detects that said instruction in said temporarily holding means preceding a branch instruction is an instruction for causing a change in the content of said at least one register.

2. A data processing system according to claim 1, further comprising:
   means for executing an instruction and generating data and an address at which said data is to be stored.

3. A data processing system according to claim 2, wherein said monitoring means includes a comparator for comparing said address of executed data with the content of said at least one register to generate an output signal when they coincide to each other.

4. An advanced control apparatus in a data processing system comprising:
   a memory for storing instructions be executed by said data processing system
   an instruction buffer register for holding at least one instruction preliminary read out from said memory;
   means for detecting a branch instruction in said instruction buffer register;
   holding means for holding information designating an address data source of said branch instruction detected by said means for detecting, said address data source being either one of an index register and base register each containing an address of an instruction to be executed;
   address calculating means for calculating an address of a target instruction by use of data in an address data source designated by said instruction in said holding means;
   target instruction fetch control means for performing an instruction fetch operation from an address calculated by said address calculating means;
   means for detecting a coincidence between said data in said address data source designated by said information in said holding means and an address where data is to be written indicated by an instruction preceding said branch instruction; and
   means for inhibiting operation of said target instruct fetch control means during detection of a coincidence by said means for detecting a coincidence causing said address calculating means to calculate an address of a target instruction when an instruction causing a coincidence to be detected precedes said branch instruction.

5. An advanced control apparatus according to claim 4, wherein said address calculating means make use of a plurality of operand address calculating means and an arithmetic operating unit.

6. A data processing system comprising:
   a memory for storing instructions to be executed by said system;
   an instruction buffer connected to said memory for holding instructions read from said memory;
   first means connected to said instruction buffer for fetching an instruction out of said instruction buffer;
   second means connected to said instruction buffer for previously reading out an instruction, not yet fetched out of said instruction buffer by said first means, from said instruction buffer to detect whether said instruction read out of said instruction buffer is a branch instruction;
   a plurality of registers connected to said first and second means for storing operand addresses of said memory;
   first address calculation means connected to said first and second means for calculating an address of a target instruction indicated by said previously read out branch instruction based on operand address data in one of said plurality of registers at a time of reading out of said target instruction from said second means to send to said memory for fetching
   third means connected to said first and second means for detecting whether an instruction preceding a branch instruction detected by said second means is an instruction for changing an address in at least one of said plurality of register specified by said branch instruction; and
   fourth means connected to said first, second and third means for indicating whether to send said target instruction fetched from said memory to said instruction buffer, said fourth means including,
   fifth means for indicating whether to send said target instruction to said instruction buffer in response to detection of a branch instruction by said second means, and
   sixth means for indicating whether to send said target instruction to said instruction buffer in response to fetching said branch instruction from said instruction buffer by said first means and detecting an instruction for changing an address by said third means before fetching said branch instruction;
   wherein said first address calculation means calculates an address of a target instruction, which is indicated by said sixth means as being a target instruction to be sent, based on address data in one of said plurality of registers in response to detection of an instruction for changing an address in said at least one of said plurality of registers specified by said branch instruction.

7. A data processing apparatus according to claim 6, further comprising:
   second address calculation means connected to said first means for calculating, in response to a request by an instruction read from said instruction buffer to fetch an operand from a first address location of said memory and store an operation result and said operand into a second address location of said memory, either one of said first and second address locations based on an address in at least one of said plurality of registers specified by said instruction read from said instruction buffer; and
   sending means for sending said address in said at least one of said plurality of registers and an address in a second register of said plurality of registers specified by said instruction read from said instruction buffer to said first address calculating means to calculate the other of said first and second address locations.

* * * * *